US007427037B2

(12) United States Patent
Frazee

(10) Patent No.: US 7,427,037 B2
(45) Date of Patent: Sep. 23, 2008

(54) ANTI-CLOGGING SHOWERHEAD DEVICE

(76) Inventor: John S. Frazee, P.O. Box 7800, S. Lake Tahoe, CA (US) 96158-0800

( * ) Notice: Subject to any disclaimer, the term of this patent is extended or adjusted under 35 U.S.C. 154(b) by 0 days.

(21) Appl. No.: 11/783,984

(22) Filed: Apr. 13, 2007

(65) Prior Publication Data

US 2007/0194153 A1 Aug. 23, 2007

Related U.S. Application Data

(63) Continuation-in-part of application No. 10/731,280, filed on Dec. 9, 2003, now abandoned.

(60) Provisional application No. 60/454,740, filed on Mar. 15, 2003, provisional application No. 60/433,102, filed on Dec. 13, 2002.

(51) Int. Cl.

| | |
|---|---|
| ***B05B 15/02*** | (2006.01) |
| ***F23D 11/34*** | (2006.01) |
| ***F23D 11/38*** | (2006.01) |
| ***F23D 14/50*** | (2006.01) |
| *E03C 1/10* | (2006.01) |
| *F16K 24/00* | (2006.01) |

(52) U.S. Cl. ....................... 239/109; 239/104; 239/111; 239/597; 239/707; 137/217

(58) Field of Classification Search ................. 137/217; 239/105, 109, 110, 111, 597, 707
See application file for complete search history.

(56) References Cited

U.S. PATENT DOCUMENTS

| | | | | |
|---|---|---|---|---|
| 588,262 | A * | 8/1897 | Boekel et al. | 239/111 |
| 2,347,988 | A * | 5/1944 | Burke | 137/217 |
| 2,629,393 | A * | 2/1953 | Langdon | 137/217 |
| 2,646,059 | A | 7/1953 | Wittner et al. | |
| 2,657,955 | A * | 11/1953 | Manning | 239/458 |
| 2,765,197 | A * | 10/1956 | Chimbole | 239/110 |
| 2,779,625 | A * | 1/1957 | Filliung | 239/111 |
| 2,890,835 | A * | 6/1959 | Filliung | 239/109 |
| 3,130,911 | A * | 4/1964 | Billeter | 239/109 |
| 3,739,983 | A * | 6/1973 | Jousson | 239/101 |
| 3,746,031 | A | 7/1973 | Christiansen | |

(Continued)

FOREIGN PATENT DOCUMENTS

DE 3934216 A1 6/1990

*Primary Examiner*—Len Tran
*Assistant Examiner*—James S Hogan
(74) *Attorney, Agent, or Firm*—Donald Grant Kelly

(57) ABSTRACT

A showerhead facilitating draining of water retained following shut-off. The showerhead includes a housing swivelably fitted on a ball-adapter which in turn includes an integral threaded segment for attachment to a water feed line. An air pathway is formed to extend from inside to outside the ball-adapter where it opens to generally atmospheric pressure. A flexible check valve in the form of an annular skirt is retained by an integral ring portion where the ball-adapter is threaded to the feed line. Under water-flow pressure, the skirt expands, blocking the passage. Upon shut-off, the skirt withdraws, instantly opening the air passage. Opening the showerhead to atmospheric pressure relieves the normally occurring suction effect which keeps water from draining completely from the showerhead spray holes. Thus avoiding the widespread problem of trapped water slowly evaporating and leaving behind stubborn and unsightly mineral deposits that eventually build up to clog showerhead spray holes.

6 Claims, 3 Drawing Sheets

U.S. PATENT DOCUMENTS

| | | | | | |
|---|---|---|---|---|---|
| 3,762,648 | A | * | 10/1973 | Deines et al. | 239/381 |
| 3,962,733 | A | * | 6/1976 | Parry | 4/615 |
| 4,272,022 | A | | 6/1981 | Evans | |
| 4,523,604 | A | | 6/1985 | Hutto | |
| 4,568,027 | A | * | 2/1986 | Lazarus | 239/590.3 |
| 4,874,006 | A | | 10/1989 | Iqbal | |
| 5,172,862 | A | | 12/1992 | Heimann et al. | |
| 5,297,735 | A | | 3/1994 | Heimann et al. | |
| 5,558,278 | A | | 9/1996 | Gallorini | |
| 5,730,361 | A | | 3/1998 | Thonnes | |
| 5,845,670 | A | | 12/1998 | Life | |
| 6,000,633 | A | | 12/1999 | Lund et al. | |
| 6,711,758 | B1 | | 3/2004 | Terek et al. | |

* cited by examiner

ANTI-CLOGGING SHOWERHEAD DEVICE

CROSS REFERENCE TO RELATED APPLICATIONS

This application is a Continuation-in-Part of Non-provisional patent application Ser. No. 10/731,280 filed Dec. 9, 2003 and now abandoned; in turn, entitled to the benefit of Provisional Patent Applications Ser. No. 60/433,102 filed Dec. 13, 2002 and Ser. No. 60/454,740 filed Mar. 15, 2003, all of which applications in their entirety are incorporated herein. All benefits of priority of the afore-referenced patent applications are hereby claimed under 35 USC 120 and 35 USC 119(e), respectively.

STATEMENT REGARDING FEDERALLY SPONSORED RESEARCH OR DEVELOPMENT

Not applicable.

REFERENCE TO SEQUENCE LISTING

Not applicable.

REFERENCE TO MICROFICHE APPENDIX

Not applicable.

BACKGROUND OF THE INVENTION

This invention relates to showerheads and other similar water flow outlets.

The present invention relates particularly to showerheads typically utilized in residential and hotel bathrooms, sports-related shower facilities and other similar locations where water is fed through a system of plumbing lines and released in the form of a spray or stream projected into a zone of use at substantially atmospheric pressure. Normally considered principally for bathing, showerheads also exist in grocery markets where vegetables are keeps moist and fire extinguishing systems.

A typical showerhead is comprised of a ball adapter attached to a water pipe extending from a wall, or in some cases from a ceiling fixture, and a flared head attached to the ball adapter. Handheld showerheads are common as well. Generally speaking, spray holes defined on a lower end or surface plate of the head emit a continuous shower of water along a water pathway with an upstream portion and a downstream portion at the head, once the water valve is set to an "on" position. The head may be pivotable or moveable on the ball adapter to direct the shower. Often showerhead output may be adjusted so as to alter the character of its spray it in terms of volume, density and/or force.

When the water valve is turned to an "off" position, to stop water flow, the inside of the showerhead is partially drained through the surface plate spray holes. Almost always, a small to moderate amount of water remains within the showerhead structure. A sealed volume of air above the remaining water is pulled upon by the weight of the remaining water such that suction is developed preventing full drainage of the water. In time, the remaining water clings to an inner showerhead surface as well around the surface plate holes where it gradually evaporates leaving a deposit of minerals contained therein. Mineral deposits or scale slowly builds up inside the showerhead and on its outer/lower surface and eventually clogs the spray holes. This is particularly true where "hard water" is involved.

Hard water, according to *The Free Encyclopedia, Wikipedia* [http://en.wikipedia.org/wiki/Hard_water] is water that has a high mineral content. This content usually consists of high levels of metal ions, mainly calcium and magnesium in the form of carbonates, but may include several other metals as well as bicarbonates and sulfates. Hard water is the principal cause of showerhead clogging. It is found throughout the world and ruins millions of showerheads each year. Hard water is found in 85% of American homes, 60% of UK homes, and 70% of Australian homes. With respect to showerhead damage, the present invention eliminates the problem of hard water.

Deposits within the showerhead distort and weaken the shower spray destroying the enjoyment and/or effectiveness of showering. Besides rendering them less than effective, they buildup of deposits are unwelcome in most environments since they are unsightly and suggest an unclean condition. In luxury hotels and finer residences, pride of ownership demands that clog-compromised showerheads be replaced regularly to ensure both optimal showers and the elimination of the aesthetically displeasing off-white lime scale build-up.

Mechanical descaling or chemical removal is not a welcome solution, since the former can be damaging to fine chrome or brass finishes and the latter requires strong acids for dissolution, a procedure posing an unhealthy situation for the laborer and may damage the surrounding trim. Moreover, the chemical residue from the chemical procedure is incompatible with preferred environmental standards.

The most common anti-clogging technique today consists of small raised, flexible rubber or silicone spray nozzles which replace old-fashioned spray holes. The idea is that lime scale buildup can be rubbed off with a finger tip—a process much easier than removing scale from a hard, flat hole. Thus the fingertip, not the nozzles, is the anti-clogging device. The RUBIT® by Hansgrohe, Inc. is an example of such a showerhead. Also featured by this company is the QUICLEAN®, a showerhead device which sports needle-like prongs advance and retract through the spray holes to clear them. This may be typical of the Heimann et al. U.S. Pat. No. 5,172,862 which shows tubular extensions through a showerhead outlet face of perforations. The extensions can be deformed to flake off lime formations. Another method of treating lime scale is soaking the showerhead in vinegar, but this is generally found to be somewhat labor intensive and ineffective. Yet another method involves a harsh chemical marketed as LIME-A-WAY®, Economics Laboratory, Inc. shows a showerhead outlet face or wall of perforations through which water is expelled, further including tubular extensions that can be deformed to flake off lime formations The present invention eliminates the need for such cleaning and/or frequent showerhead replacements, which makes it economically desirable. This is especially true when considering the additive costs of new equipment purchase, labor and associated expenses involved in the effort. Further, the present invention is considered "green" in the context of global environmental concerns. Substantial elimination the root cause of the scaling obviates harsh chemical treatment of the clogged facilities. Besides, the shower spray in a non-scale, essentially clean condition will not wastefully skew water spray in several directions. Widespread use of the present invention will avoid millions upon millions of showerheads from crowding landfills worldwide.

In addition to the above-noted examples, a significant number of inventors have proposed a variety of solutions to the problem of water retention and mineral deposits. To date, none among prior art documentation has offered the effective and elegantly simple solution presented herein. This will be evident from the following review of other pre-existing patent disclosures which were made of record in the above-named parent application, most notably those delving into a variety of valve and diverter control systems.

For example, in U.S. Pat. No. 5,558,278, patentee Gallorini presents a shower nozzle equipped with a ventilation opening included among the shower spray holes, obviously altering the character of the spray pattern. Patentee Life, in U.S. Pat. No. 5,845,670, illustrates a multi-part, spring-loaded diverter valve with a vacuum breaker, notably for roman tubs. U.S. Pat. No. 4,272,022 granted to Evans shows a showerhead with skirt housing swivelably mounted on a ball joint, and including an orifice plate and an axially adjustable face plate providing a self-flushing feature.

Thonnes' U.S. Pat. No. 5,730,361 illustrates a showerhead device with decalcification achieved through means of deflecting elastic nozzles affixed outside the spray plate water openings. Iqbal's U.S. Pat. No. 4,874,006 presents a mechanically complex valve assembly diverting water to a bathtub and to a shower or hand held shower, and reducing a vacuum effect when operating between a shower outlet position and the bath outlet.

U.S. Pat. No. 6,000,633 granted to Lund et al. shows a spray nozzle with a plurality of blind recesses disposed around its central outlet orifice such that in combination each reduces the likelihood of residue buildup in the other. Terek et al. in U.S. Pat. No. 6,711,758 illustrates an emergency shower and eyewash system with large capacity container, and including release valve to periodically release liquids from the container during maintenance and cleaning. Further included is a conditioning means ensuring that fluid in the container is not allowed to become harmful through bacterial or microorganism growth as can be common in stagnant liquids.

A tub/shower diverter valve invention, as represented by U.S. Pat. No. 4,523,604 granted to Hutto, illustrates a valve body with a flange which rotatably seats an elastomeric sleeve. When the sleeve is aligned over a tub spout outlet and water supply is turned on, back pressure caused by the showerhead flexes the sleeve to seal the tub spout orifice. When water supply is turned off, the elastomeric sleeve relaxes to allow water to drain into the tub spout. Wittner et al. in U.S. Pat. No. 2,646,059, show an automatic drain valve for portable irrigation pipes.

A patent granted to Christiansen, and identified as U.S. Pat. No. 3,746,031, presents a tub spout construction effecting control of water flow to tub or shower, and including an exterior lift knob control and venting means permitting water to flow into the tub. Heimann et al., in their U.S. Pat. No. 5,297,735, show a hand-held shower unit with a water feed tube assembly having a set of drain holes to prevent accumulation of water in the housing.

Westerhoffs German Patent DE 3934216 presents a single outlet mixer tap with a pull-out spray nozzle assembly wherein transverse holes include a valve closed during normal water flow conditions and automatically opening for air to enter in case of a vacuum. This prevents dirty water being drawn past the fitting and into the pipe system should the spray nozzle be permitted to reside in a full basin.

U.S. Pat. No. 2,347,988 issued to Burke illustrates a valve construction for use in hydraulic circuits, lines, piping, tubing, hose or the like wherever exists risk of reverse flow under atmospheric pressure or by a symphonic action. These valves are particularly suited in industrial situations where flow of liquids to or from tanks or the like has to be controlled and where the hydraulic system has inherently the risk of back flow upon loss or failure of head. This type of valve, of course, would not be applicable in a showerhead setting where discharge is into an open atmospheric environment and backflow is not an issue. Moreover, inserting the valve structure presented by Burke into a shower system would not cure the problem of mineral deposits since Burke includes slits defining flaps which will, upon flow shutdown, retain fluid within the rubber element. Burke's construction is counter to the nature and purpose of the present invention where water is to be completely vented from the showerhead to a non-pressurized zone.

Parry's U.S. Pat. No. 3,962,733 presents an all weather safety shower with a showerhead. The objective of Parry is to provide strategically located bleed means for draining water from the shower such that water will not remain within the system and become frozen or exceptionally hot in harsh weather conditions. The bleed systems are a measurable distance upstream of the showerhead device and have nothing to do with clogging buildup of water minerals.

Langdon, in U.S. Pat. No. 2,629,393, illustrates another backflow prevention system similar to that presented by Burke, discussed hereabove. In this patent is disclosed a combination check and vent valve for preventing backflow in a closed system. Shown are vent holes closed by an internal skirt member as it is subjected to internal pressure when fluid flows therethrough. When flow stops, the vent holes open to ensure against backflow into the fluid supply line. It is important to note that Langdon presents a check valve member with the normally closed slits. The formulation of the normally closed membrane slits will continuously retain at least some water immediately upstream of its membrane. There is no indication that liquid downstream of Langdon's combined valve is permitted to egress.

The present invention is unlike anything in existence. The novel showerhead device by-passes the clogging problem by eliminating the cause. Hence, there is nothing (in the way of mineral deposits) to treat or remove. When water in the present, inventive showerhead is shut off post-showering, the apertured vacuum-breaking check-valve allows all water within the showerhead to automatically and immediately drain out through the lower spray holes. No water, no evaporation, no lime scale, no clogging.

An objective of the present anti-clogging showerhead device is to more completely drain a showerhead to reduce mineral deposits and thus clogging. Among other objectives is to present a device that allows automatic draining of the showerhead and its supply line when water flow is shut off. Also among the objectives is to present a showerhead device that may easily be retrofitted to existing shower facilities or appliances.

An anti-clogging showerhead device is comprised of an air pathway communicating with the water pathway and disposed along said water pathway upstream of the spray holes of a showerhead. When the water is turned off, air is drawn by draining water into the showerhead above the above the spray holes through the air pathway. Therefore, suction above the water is prevented from developing, and the showerhead is able to drain more completely. The air pathway may be provided in the water pipe extending (for example) from the wall, in the showerhead. The air pathway may be comprised of at least one hole within the showerhead housing itself, but covered or closed during water passage therethrough because of the water pressure itself.

The automatic valve may be comprised of a flexible member or membrane which is pushed against said at least one hole when water is turned on, and permitted to self-retract from said hole when the water is turned off and the pressure subsides. As suggested by the above wording, there can be more than one hole, and the flexible member may be substantially annular so as to engage all said holes generally simultaneously.

BRIEF DESCRIPTION OF THE DRAWINGS

The invention will be best understood by reference to the following detailed description of an illustrative embodiment when read in conjunction with the accompanying drawings, wherein.

DETAILED DESCRIPTION OF THE INVENTION

Figure 1:
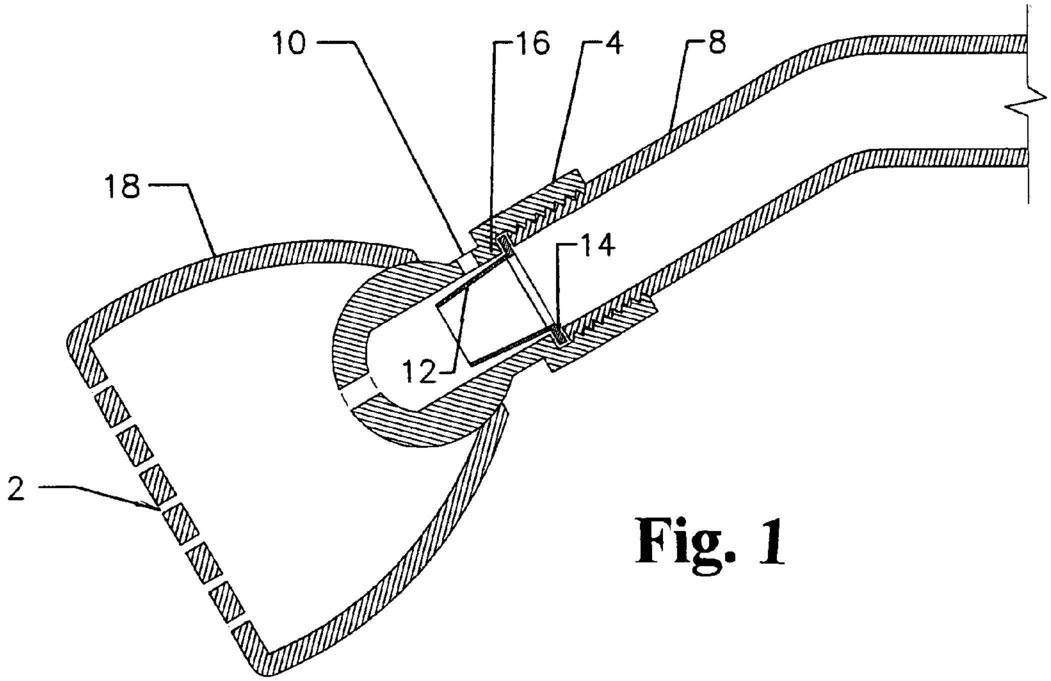
FIG. 1 is a sectional side elevation of the anti-clogging showerhead device shown fastened to a water supply pipe.

As viewed in FIG. 1 the inventive non-clogging showerhead device includes showerhead 18 with ball-adapter 4 defining a water pathway, with an upstream pathway portion and downstream pathway portion, in open communication with a supply line 8 through which water will be directed to flow. An array of holes 2 are illustrated at a lower (or downstream) discharge area of showerhead 18, and egress of water flowing through ball-adapter 4 and into the showerhead 18. As is well known in the prior art, showerhead 18 is adjustably fitted to said ball-adapter 4 so as to be swivelably mounted thereon.

An upper portion of the ball-adapter 4 (generally upstream of the showerhead 18) includes an internally threaded portion configured to cooperatively interconnect with a complementary threaded terminal portion of water supply line 8 (at a downstream portion of said supply line 8). Adjacent said internally threaded portion of ball-adapter 4 is a shoulder rest 16 which may be integral with the ball-adapter 4. Shoulder rest 16 may also be an element separate from said ball-adapter 4, yet cooperating to form said shoulder rest 16. In any case, when ball-adapter 4 is threaded into position on the water supply line 8, the shoulder rest 16 and a downstream terminus of supply line 8 form an annular gap.

An air pathway 10 is positioned on said ball-adapter 4 downstream of said shoulder rest 16 such that an air passage is formed from inside said ball adapter 4, immediately downstream from said shoulder rest 16 and extending adjacent said water pathway, and terminating at an outside surface of ball-adapter 4.

Adjacent said air pathway 10 is a check valve 12. Valve 12 may include an upstream flange or mounting ring 14 configured to fit within said annular gap between shoulder rest 16 and downstream terminus of supply line 8 so as to be trapped therein when ball-adapter 4 and water supply line 8 are threadably engaged. Both the shoulder rest 16 and said mounting ring 14 may, of course, be open and substantially annular in form so as to function as a required showerhead/water line washer disposed between said ball-adapter 4 and said supply line threaded terminal portion. However, a separate washer (not shown) could perform this role while the mounting ring could actually be less than annular (e.g., segmented) yet having sufficient surface to permit its being trapped in said gap. While not shown it will be understood this structure could be defined as a segmented valve ring collaborating with an annular washer. In any case, as illustrated 1 and 2, the water flow pathway through supply line 8, ball-adapter 4 and showerhead 18 remain continuously open.

Figure 2:
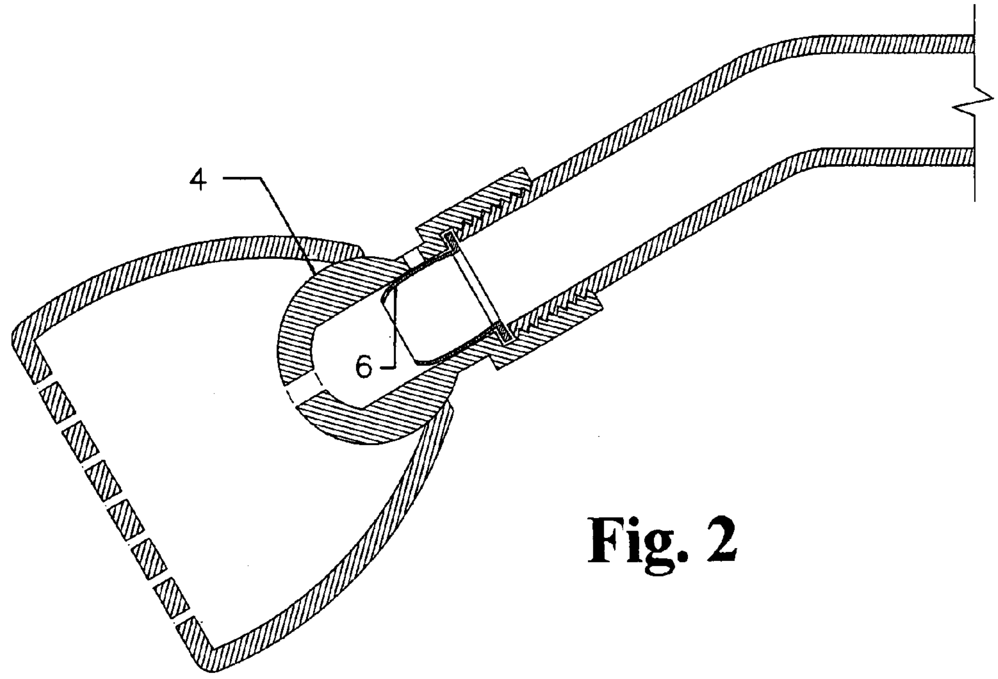
FIG. 2 is a sectional side elevation of the showerhead device shown in FIG. 1 and with its check valve member engaged.

Check valve 12 is seen in FIG. 2 as exhibiting a flexible feature when water pressure exists with in the water line 8 and showerhead 18. Valve 12 may be fabricated or formed of elastomers, silicone, urethane and/or the like material so as to readily flex under pressure and to have material memory characteristics to cause its return to a shape such as that depicted in FIG. 1. For example, the shape depicted in FIG. 1 is generally that of a truncated cone or skirt. In FIG. 2 the same element is shown distended to a generally bulbous form such that it blocks air pathway 10 when water pressure is exerted at its interior.

Figure 3:
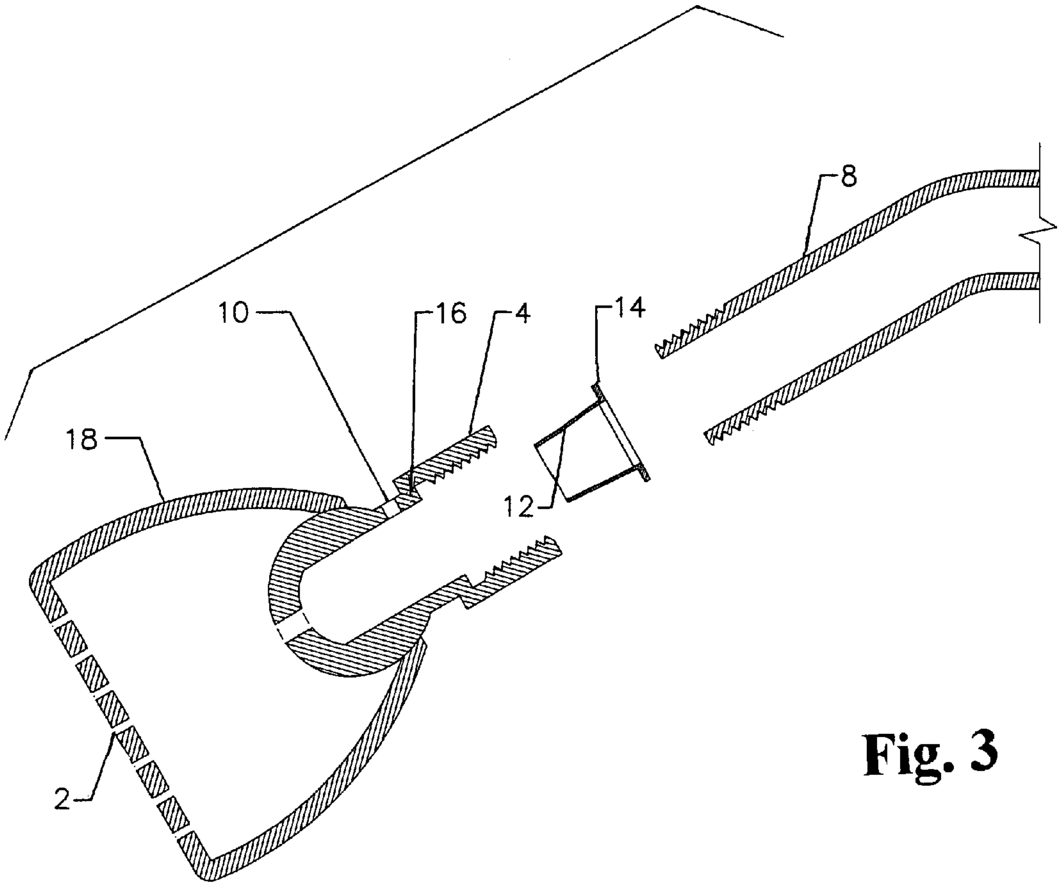
FIG. 3 is a sectional side elevation similar to FIGS. 1 and 2, but showing certain parts in exploded position.

FIG. 3 illustrates the simplicity of construction of the present invention. Assembly showerhead 18 and ball-adapter 4 are interconnected as a unit which might be made available as a kit manufactured to fit most existing or standard water lines. Flexible check valve 12 is shown positioned for insertion onto its shoulder rest 16 where it will be trapped when engaged by a downstream end or terminus of water line 8 as the assembly showerhead 18 and ball-adapter are threaded into position for operation. When assembled, and in operation, the act of shutting off water flow from water line 8 and along water pathway through ball-adapter 4 and showerhead 18 will relieve the internal pressure. This pressure reduction, in turn, will permit the flexible valve 12 to relax and withdraw from air passageway 10 thus permitting the showerhead 18 to drain completely.

Figure 4:
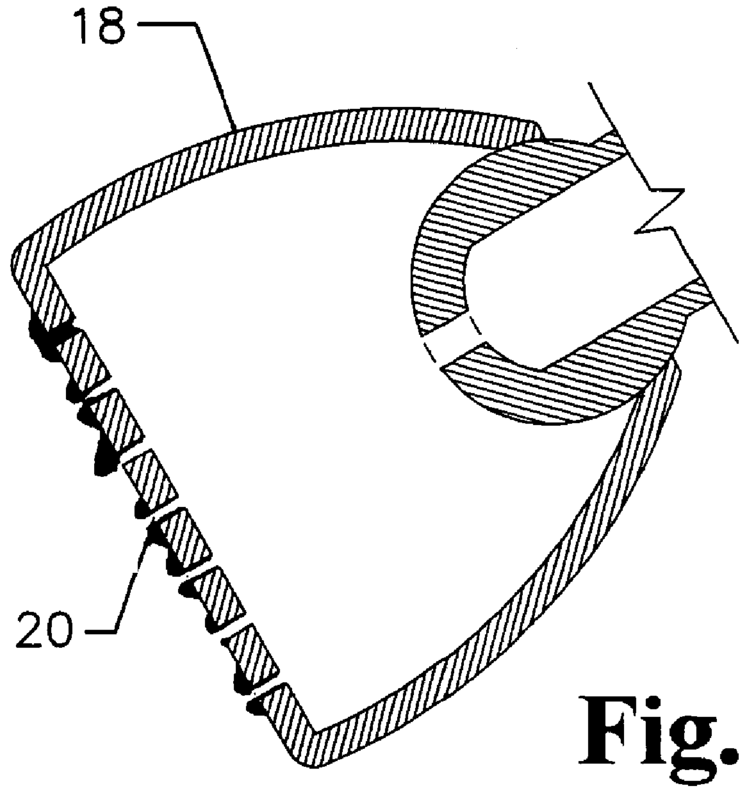
Fig. 4 PRIOR ART
FIG. 4 is a sectional side elevation of a PRIOR ART showerhead.

With the novel invention illustrated and described, showerhead 18 will be free of the unwanted deposits 20 depicted in PRIOR ART illustration FIG. 4. New shower installations would include the showerhead 18 and ball-adapter 4 of the present invention, with the internal, flexible check valve. Existing shower installations of the type depicted in FIG. 4 can easily be retrofitted with the novel assembly described.

Although various embodiments of the present invention have been described in the foregoing detailed description and illustrated in the accompanying drawings, it will be understood that the invention is not limited to the embodiments disclosed, but may assume numerous arrangements, rearrangements, modifications, and substitutions of steps without departing from the spirit of the invention nor from the scope of the following claims.

I claim:

1. An anti-clogging showerhead device comprising a head with a surface plate defining outlet spray holes therethrough, and including a ball-adapter with a threaded section at a first end thereof configured to engage a threaded terminal portion of a supply line extending upstream of said head, said showerhead device further characterized by:

said threaded section of said ball-adapter including an annular shoulder rest portion;

said head is mounted on said ball-adapter at a second end of said ball-adapter;

said head and said ball-adapter configured to define therein a continuously open water pathway from said supply line through said outlet spray holes, said ball-adapter having upstream and downstream portions wherein said ball-adapter first end is open to said supply line located generally at said upstream portion and said plate defining spray holes is located generally at said downstream portion of said water pathway;

said ball-adapter first end having defined therethrough at least one air pathway along said water pathway upstream portion, wherein said at least one defined air pathway extends from an internal surface of said ball-adapter adjacent said water pathway to a point external of said ball-adapter and opening to generally atmospheric pressure;

a flexible valve element extending adjacent said internal surface of said ball-adapter, said valve element having an outwardly flexed condition where it is pressed against and substantially blocks said air pathway and a generally relaxed condition where it is spaced slightly from said ball adapter inner surface and air pathway;

said flexible valve element further including an open substantially annular mounting ring portion positioned at said annular shoulder rest portion of said ball-adapter so as to serve as a sealing washer between said ball-adapter upstream portion and said supply line threaded terminal portion;

whereby during typical operation of said showerhead device pressure of water flowing from said open supply line along said pathway expands said flexible valve element against said at least one air pathway preventing water seepage therefrom and, when water flow is shut off upstream of said supply line, the valve element retracts to open said air pathway immediately relieving suction within said showerhead device, thus permitting water retained in said showerhead and supply line to escape rather than be retained for evaporation resulting in mineral deposits.

2. The anti-clogging showerhead device of claim 1 wherein the air pathway defined in the ball-adapter first end is located between said shoulder rest portion and said surface plate.

3. The anti-clogging showerhead device of claim 2 wherein the air pathway defined in the ball-adapter first end is located between said shoulder rest portion and the ball-adapter second end.

4. The showerhead device of claim 1 wherein said threaded section is internal of said ball-adapter and terminates adjacent said annular shoulder rest portion.

5. The showerhead device of claim 1 wherein said head includes a housing skirt configured to be swivelable on said ball-adapter.

6. The showerhead device of claim 1 wherein the flexible valve is in the general form of a truncated annular skirt extending in its relaxed condition axially within said ball-adapter and normally spaced from said ball adapter inner surface and air pathway;

whereby pressure of water flowing from said open supply line through the ball-adapter acts to expand the flexible annular skirt against said at least one air pathway, and relief of such pressure at shut-off permits the flexible valve skirt to withdraw from said air pathway so as to open said pathway.

* * * * *